US006401661B1

(12) United States Patent
Emery (10) Patent No.: US 6,401,661 B1
(45) Date of Patent: Jun. 11, 2002

(54) SELF-CLEANING PET LITTER BOX ASSEMBLY

(76) Inventor: Richard H. Emery, 725 Miami Ave., Terrace Park, OH (US) 45174

( * ) Notice: Subject to any disclaimer, the term of this patent is extended or adjusted under 35 U.S.C. 154(b) by 0 days.

(21) Appl. No.: 09/633,489

(22) Filed: Aug. 7, 2000

Related U.S. Application Data

(63) Continuation-in-part of application No. 09/476,349, filed on Jan. 3, 2000.
(60) Provisional application No. 60/182,170, filed on Feb. 14, 2000.

(51) Int. Cl.[7] ............................................... A01K 29/00
(52) U.S. Cl. ....................................................... 119/166
(58) Field of Search ................................. 119/166, 161, 119/163, 164, 165, 168, 162

(56) References Cited

U.S. PATENT DOCUMENTS

| | | | |
|---|---|---|---|
| 4,096,827 A | 6/1978 | Cotter | 119/166 |
| 4,574,735 A | 3/1986 | Hohenstein | 119/163 |
| 4,846,104 A | 7/1989 | Pierson, Jr. | 119/166 |
| 5,048,464 A | 9/1991 | Shirley | 119/166 |
| 5,048,465 A | 9/1991 | Carlisi | 119/166 |
| 5,188,062 A | 2/1993 | Joy et al. | 119/164 |
| 5,289,799 A | 3/1994 | Wilson | 119/164 |
| 5,460,122 A | 10/1995 | Reinartz | 119/164 |
| 5,477,812 A | 12/1995 | Waters | 119/163 |
| 5,662,066 A | 9/1997 | Reitz | 119/163 |
| 5,749,318 A | 5/1998 | Barbot et al. | 119/166 |
| 5,931,119 A | 8/1999 | Nissim et al. | 119/163 |

Primary Examiner—Charles T. Jordan
Assistant Examiner—Yvonne R. Abbott
(74) Attorney, Agent, or Firm—Wood, Herron & Evans, LLP (57) ABSTRACT

A self-cleaning pet litter box assembly automatically separates clumped material from unclumped pet litter and disposes of it. The assembly comprises an open-top pet litter container mounted for substantially horizontal rotation, a motor to rotate the container, and a stationary separating member positioned to extend into the container to contact pet litter within the container. The pet litter container rotates so that clumped and unclumped material in the container is moved into contact with the separating member. Clumped material is separated out by the separating member and directed away to a waste receptacle.

26 Claims, 10 Drawing Sheets

SELF-CLEANING PET LITTER BOX ASSEMBLY

The present application is a continuation-in-part of my co-pending U.S. Ser. No. 09/476,349, filed Jan. 3, 2000 and entitled "SELF-CLEANING PET LITTER BOX ASSEMBLY", and also claims the filing benefit of U.S. Provisional Application No. 60/182,170, filed Feb. 14, 2000 and entitled "HORIZONTALLY ROTATING PET LITTER BOX ASSEMBLY", each disclosure of which is hereby incorporated herein by reference in its entirety.

FIELD OF THE INVENTION

The present invention relates generally to pet litter box assemblies and, more particularly, to a self-cleaning pet litter box assembly wherein clumped material is separated from reusable unclumped litter material.

BACKGROUND OF THE INVENTION

A large number of households have one or more animal pets. Domestic cats in particular are estimated to live in over thirty million homes all or most of the day. A litter box or the like is a necessity for such homes. In fact, basic litter boxes which are rectangular-shaped with a height of about four to five inches have been used for many years. While much development work has been expended in producing improved litter material to make it more absorbent, odor-free, dust-free, etc., very little change has occurred in the basic litter box itself. Those boxes being presently commercialized are remarkably similar to those of several years ago.

Maintaining pet litter boxes requires frequent cleaning and attention. This job is unpleasant due to odor. Strong odor and unsanitary conditions develop quickly if the pet litter box is not properly maintained on a frequent basis. Busy schedules and travel make proper attention to the pet litter boxes difficult.

The basic conventional litter boxes are popular simply because they have proven themselves effective. Cats are readily trained to use them. The biggest drawback associated with the conventional litter box is a need to periodically remove soiled litter material and replenish it with new litter material. Any cat owner will attest to the fact cats are fastidious. They will not use a litter box which contains what they consider an excessive amount of soiled litter material. The cat owner can at that point simply dump the full contents of the litter box into the trash or otherwise dispose of it. This, of course, is wasteful and expensive in that a substantial amount of unsoiled litter material is being disposed of along with the soiled litter material. It is more common for the cat owner to try to segregate soiled from unsoiled litter material. This is possible because most litter materials are designed to clump when wetted. Various scoops are sold for this purpose. However, the task of scooping clumped soiled litter material and cat feces from a litter box is still an arduous and unpleasant task.

The problem with cleaning and keeping the contents of a litter box in a state which is acceptable to the cat is well recognized. Several attempts have been made over the years to remedy the problem. U.S. Pat. Nos. 4,846,104, 5,048,464, and 5,662,066 are directed to self-cleaning litter systems wherein specially configured spherical or cylindrical containers rotate in a manner to separate clumped from unclumped litter material. U.S. Pat. Nos. 4,574,735, 5,048, 465 and 5,477,812 are also directed to self-cleaning litter systems. Basically, the systems have a stationary litter container and a rake or comb-type device that periodically moves through litter in the container to separate out clumped material. The clumped material is directed to a separate disposal system as part of the process. U.S. Pat. No. 5,931, 119 is directed to a self-cleaning litter system including a horizontally rotatable litter container and a raking mechanism for gathering and removing animal waste from the rotating litter container and depositing the waste into a collection container. The raking mechanism is moved from a position in contact with the litter material to a parked position clear of the litter material after depositing the gathered waste into the collection container.

The systems and articles described in the prior art are either too complex, too expensive or simply do not work for one reason or another. It is evident that cat owners recognize the drawbacks of known litter boxes. It is surmised that most would be willing to invest added money into a self-cleaning pet litter box if it truly worked.

There is clearly an ongoing need for an improved pet litter box cleaning system. Any improvement must take into account the cat's habits and needs. Most importantly, it must not increase the cat owner's cleaning efforts or add to the unpleasantness of the task. In accord with this recognized need, there has been developed a pet litter box assembly which meets known needs. The assembly is a self-cleaning pet litter box which is effective without significant disadvantages.

SUMMARY OF THE INVENTION

A self-cleaning pet litter box assembly includes a pet litter container mounted for substantially horizontal rotation on a base member. The pet litter container is motor driven to rotate and during the rotation segregate clumped material from unclumped litter material. A motor is mounted on the base member and is operatively connected to the litter container to slowly and continuously or intermittently rotate the container. The pet litter box assembly also includes a stationary or fixed separating member that extends into the litter within the litter container. As the litter container rotates, clumped and unclumped litter material move into contact with the separating member. Unclumped litter passes through the separating member and remains in the litter container for reuse. Soiled clumped litter is retained on the separating member and is directed away to a waste receptacle. A conveyor may be provided to convey the separated-out clumped litter material toward the waste receptacle. The pet owner periodically must empty or replace the waste receptacle, however, the task in less often and not as unpleasant as before.

DETAILED DESCRIPTION OF THE INVENTION

The self-cleaning pet litter box assembly of the invention and its method of use are described in detail in the following paragraphs and with reference to the drawings. The assembly is described with reference to its use by cats. While other domestic animals can be trained to use the pet litter box assembly and such other uses are contemplated, the need for the assembly by cat owners is greatest and for this reason the description which follows is directed to cat usage.

As used throughout this specification, clumped material is used to mean pet feces and soiled pet litter which has clustered to form a clump. Unclumped litter material includes fresh pet litter and substantially clean free-flowing pet litter which is reusable.

Figure 1:
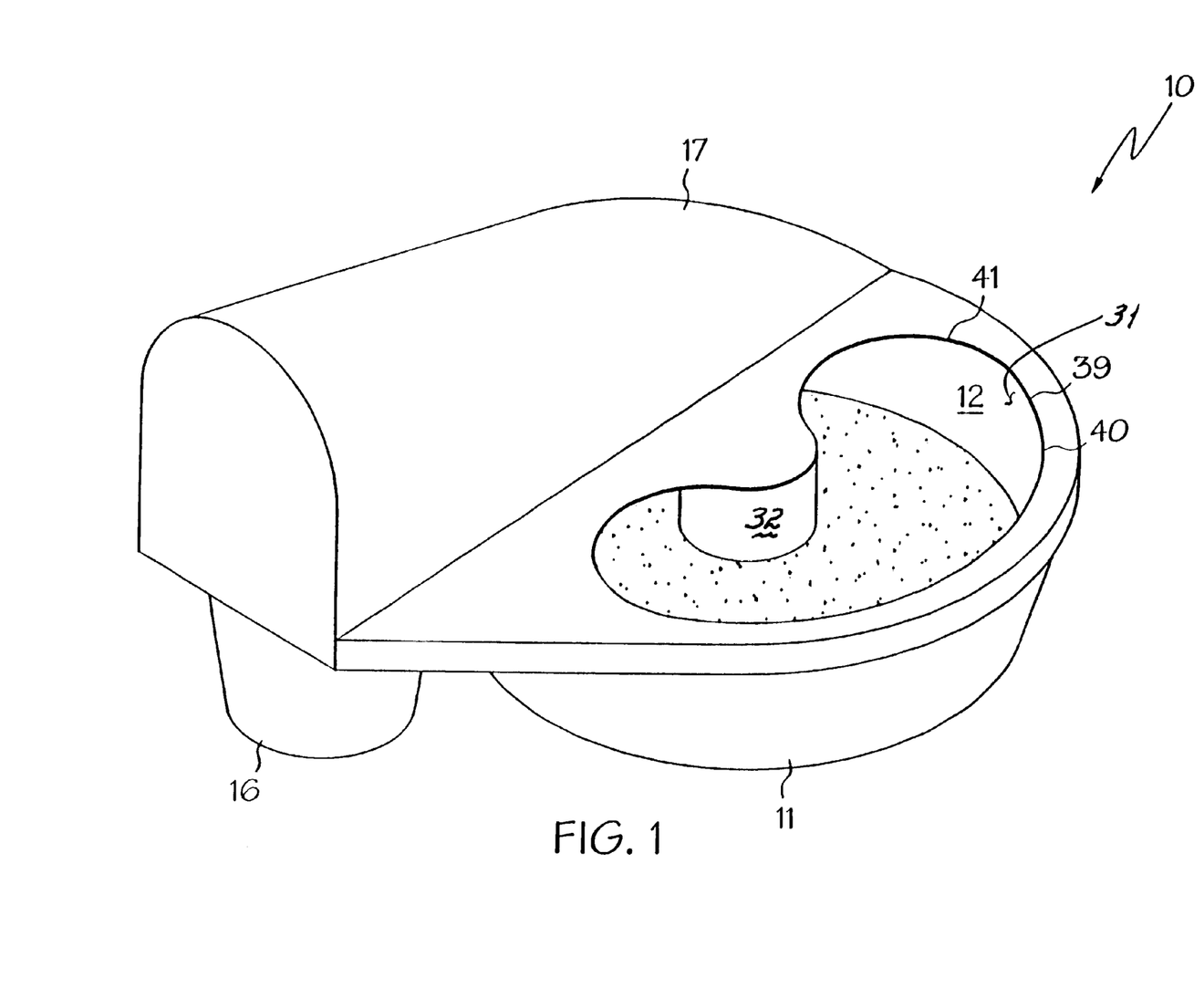
FIG. 1 is a view in perspective of a self-cleaning pet litter box assembly in accordance with one embodiment of the present invention.
Figure 2:
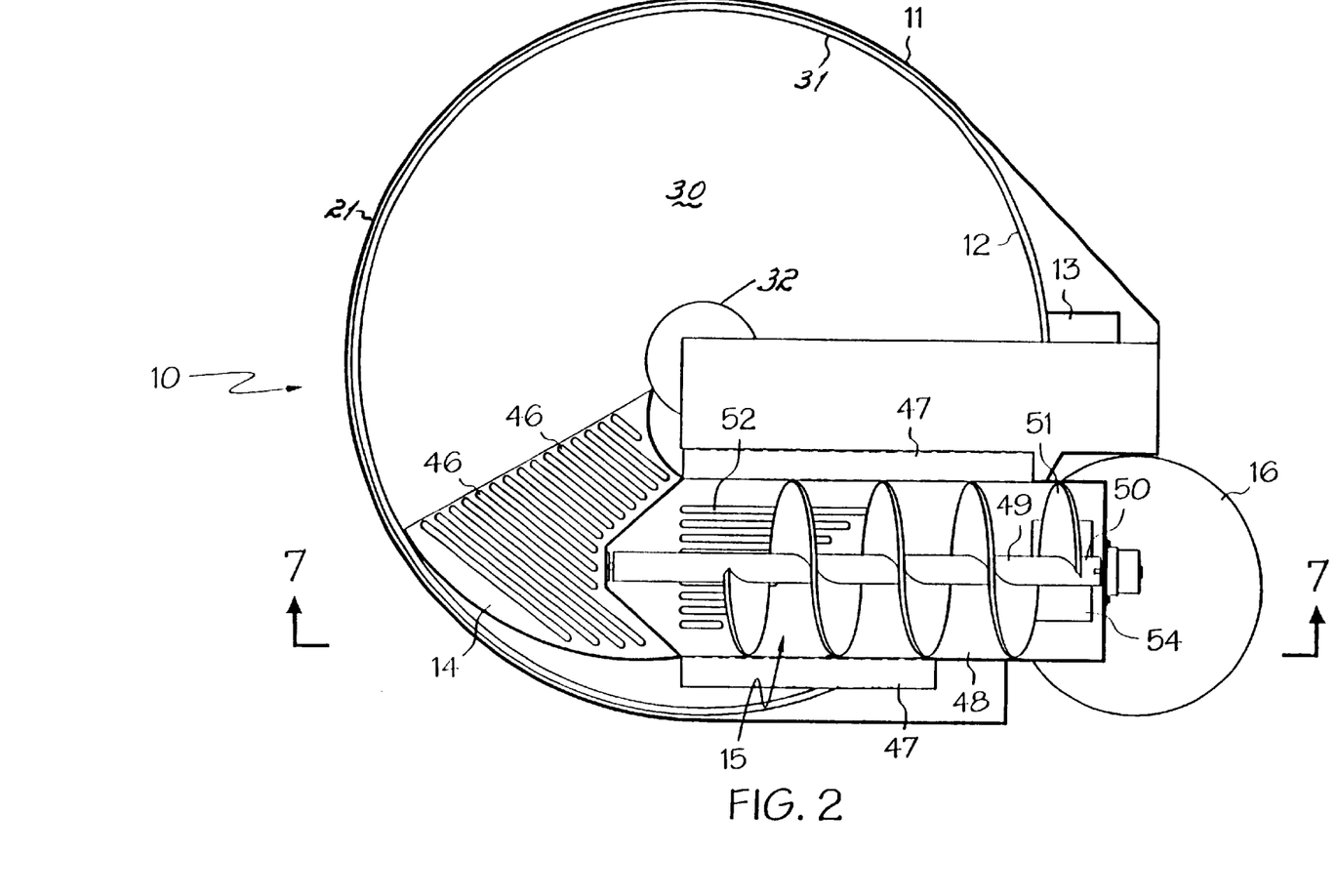
FIG. 2 is a top plan view of the self-cleaning pet litter box assembly of FIG. 1 with pet litter and a cover removed for illustrations purposes.

With reference to FIGS. 1 and 2, there is shown a self-cleaning pet litter box assembly 10 of the invention. The assembly comprises a base member 11, an open-top pet litter container 12, a drive mechanism such as a motor 13, a stationary or fixed sieve member 14, a conveyor 15, and a waste receptacle 16. The aforementioned components are operably connected so that the litter container continuously or intermittently rotates and any clumped material in the litter container is segregated from unclumped litter material and conveyed away. A cover 17 for the open-top pet litter container 12 is optional, though very preferred. Each of the aforementioned components and their interaction are described in detail in the following paragraphs, as well as a manner of operation of the assembly.

Figure 7:
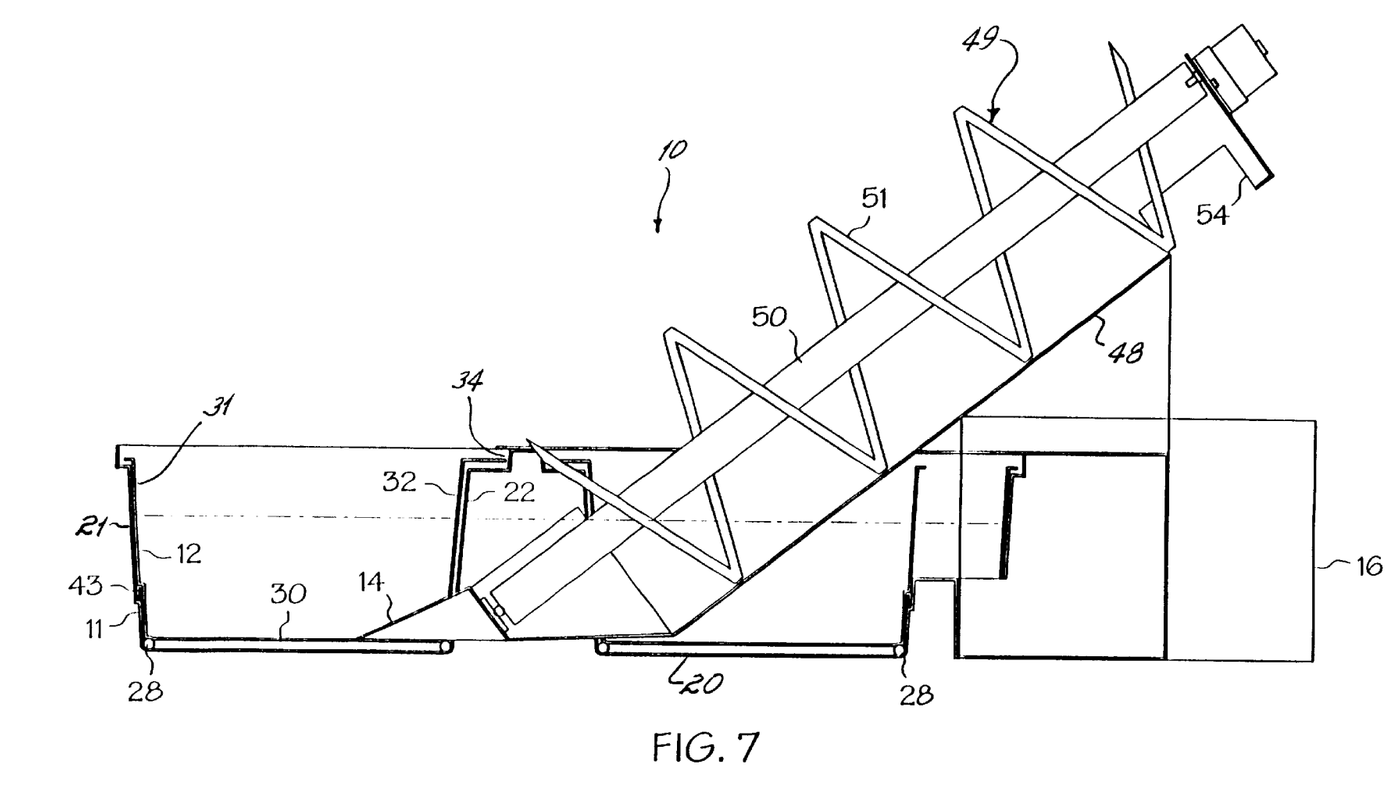
FIG. 7 is a side elevational view in partial section of the self-cleaning pet litter box assembly of FIG. 2 taken along line 7—7 thereof.
Figure 8:
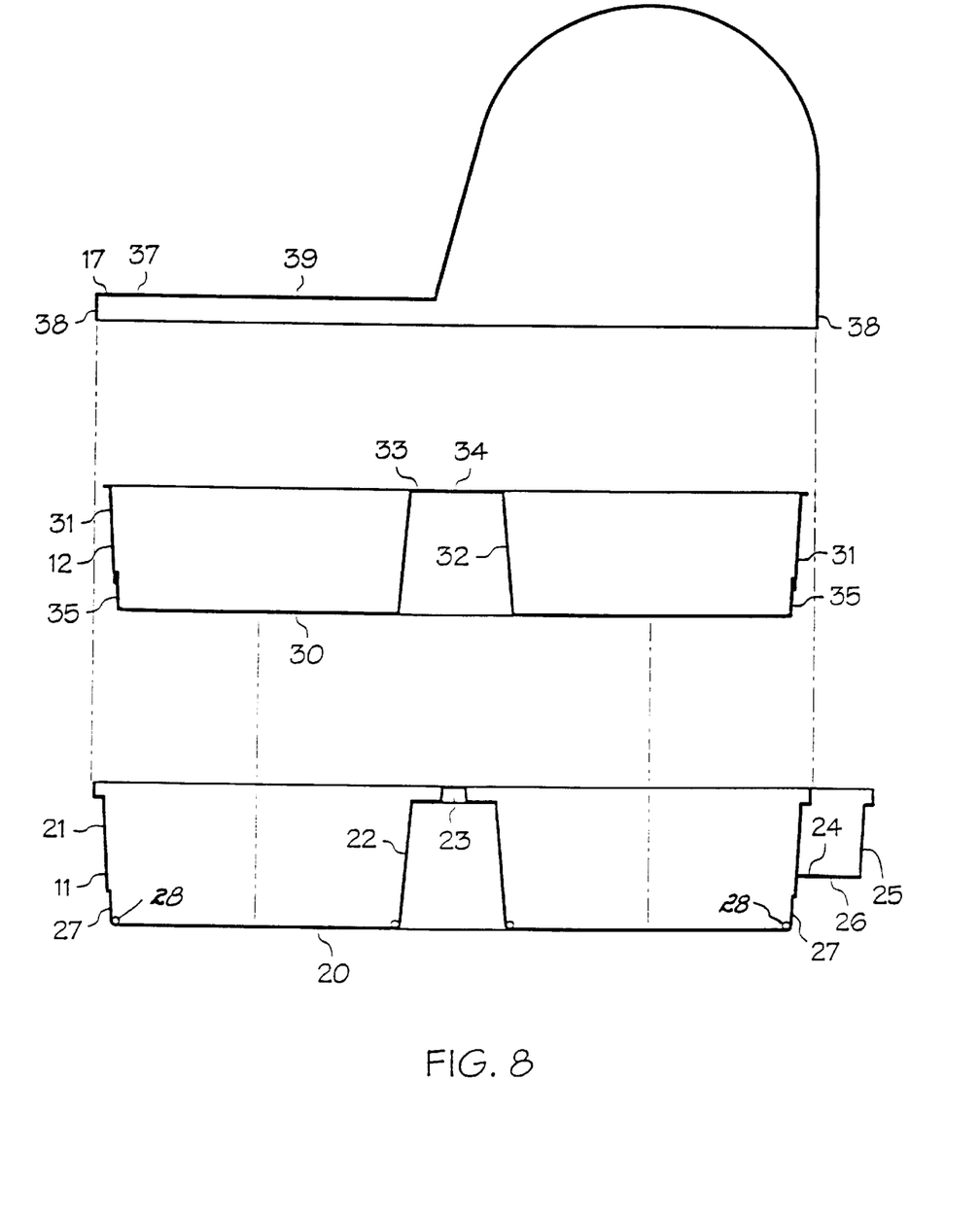
FIG. 8 is a side elevational exploded view in section of the base member, pet litter container and cover components of the self-cleaning pet litter box assembly of FIG. 1.

The base member 11 is configured to accommodate the pet litter container 12 and the motor 13. As evident in FIGS. 1, 2, 7 and 8, the pet litter container 12 fits onto the base member 11 in a manner whereby it can rotate about the pet litter container's center vertical axis. The motor 13 is mounted on the base member 11 and supplies power to the pet litter container 12 to cause its rotation. As best seen in FIG. 8, the base member 11 has a substantially flat bottom wall 20 to sit on a floor surface. It has upstanding sidewalls 21 extending from the flat bottom wall 20. The base member also has a center mount post 22 extending from the bottom wall 20. A top of the center mount post 22 has a guide knob 23 to receive the open-top pet litter container 12 as further described below. A support ledge 24 extends from the base member 11 to accommodate the motor. Preferably, the motor is contained in an enclosure which includes the support ledge 24 and upstanding sidewalls 25 which surround the motor. A drive shaft hole 26 is cut in the support ledge 24 to accommodate the motor's drive shaft as further discussed below. The advantage of the enclosure for the motor is to protect the motor from contaminates.

Still with reference to FIG. 8, the base member 11 has a lower recess 27 in its sidewalls 21 which extends fully around the base member. The lower recess is to accommodate a drive belt running off the motor 13 as discussed below. As seen in FIGS. 7 and 8, a bearing ring 28 extends around the inside rim of the base member bottom wall to facilitate rotation of the pet litter container 12.

With reference to FIGS. 2 and 8, the open-top litter container 12 is generally circular and is dimensioned to fit within the sidewalls 21 of the base member 11. Its size is not critical. Generally, it is small enough to be hand carried and not occupy excessive space or become conspicuous by its size alone. Preferred for ease of use and manufacturing reasons are the circular-shaped open-top containers which have a diameter of about fourteen inches to about thirty-six inches and a depth of about three inches to about six inches. It has a flat bottom wall 30 and upstanding sidewalls 31. Preferably, the litter container has a diameter of from about fourteen inches to about twenty-four inches and sidewalls of from about three inches to about five inches. Such a dimensioned pet litter container holds sufficient pet litter for the purpose intended.

The open-top pet litter container 12 also has a hollowed center post 32 dimensioned to overlie the center mount post 22 of the base member 11. The center post 32 further has a flat top wall 33 with a hole 34 dimensioned to loosely fit over the guide knob 23 of the base member's center mount post 22. As should be apparent, the litter container is free to rotate on the bearing ring 28 of the base member 11. A lower recess 35 in the pet litter container 12 is configured to accommodate the lower recess 27 of the base member 11 and the drive belt of the motor.

While not shown, other base member and pet litter container configurations are feasible. For example, a pet litter container can fit onto a base member which does not have a center mount post. That is, the base member can have a low profile with a substantially flat top surface on which the pet litter container sits. The pet litter container is rotationally mounted in known manners. Most importantly, the pet litter container is configured to rotate about a vertical axis to accomplish its purpose.

The cover 17 for the open-top pet litter container is optional, but very preferred. It makes the self-cleaning pet litter box assembly 10 more aesthetically pleasing and also helps to protect moving components of the assembly. The cover 17 as evident in FIG. 1 is dimensioned to fully cover the top surface of the litter container 12. As evident in FIG.

8, it has a flat top surface 37 with a downwardly turned annular lip 38. The lip extends over the pet litter container 12 at least about one inch to remain stable, though can extend fully to ground surface. An opening 39 in the flat surface 37 is sufficiently large to accommodate a cat. As shown in FIG. 1, the opening has a curved edge 40 which follows the curved edge of the generally circular pet litter container 12 and smoothly curved edges 41 extending from the curved edge 40 to a center of the cover. Other shaped openings are feasible. Preferably, the opening is sized to expose from about 25% to about 75% of the top surface area of the pet litter container 12.

Figure 4:
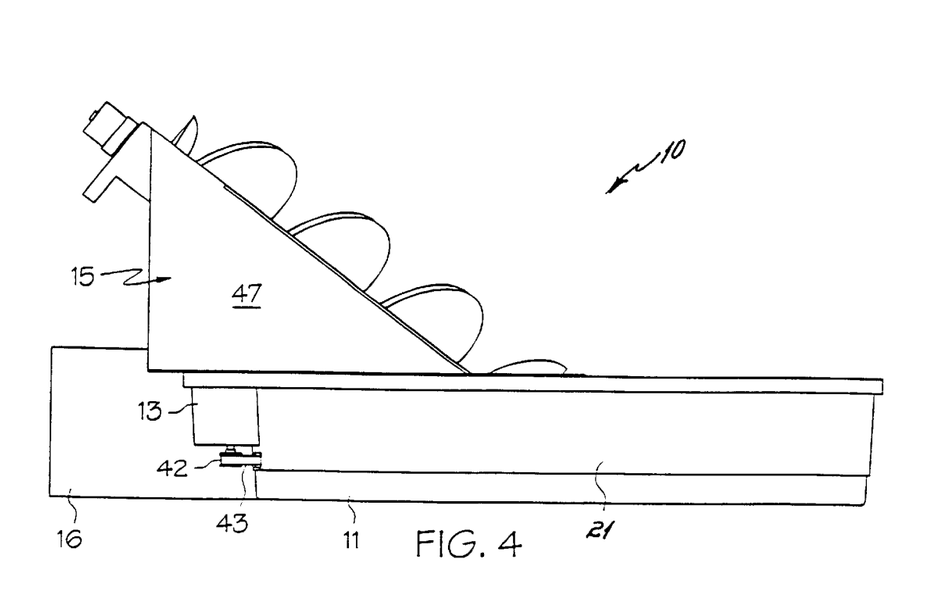
FIG. 4 is a side elevational view of the self-cleaning pet litter box assembly of FIG. 2 illustrating in particular a placement of a motor.
Figure 5:
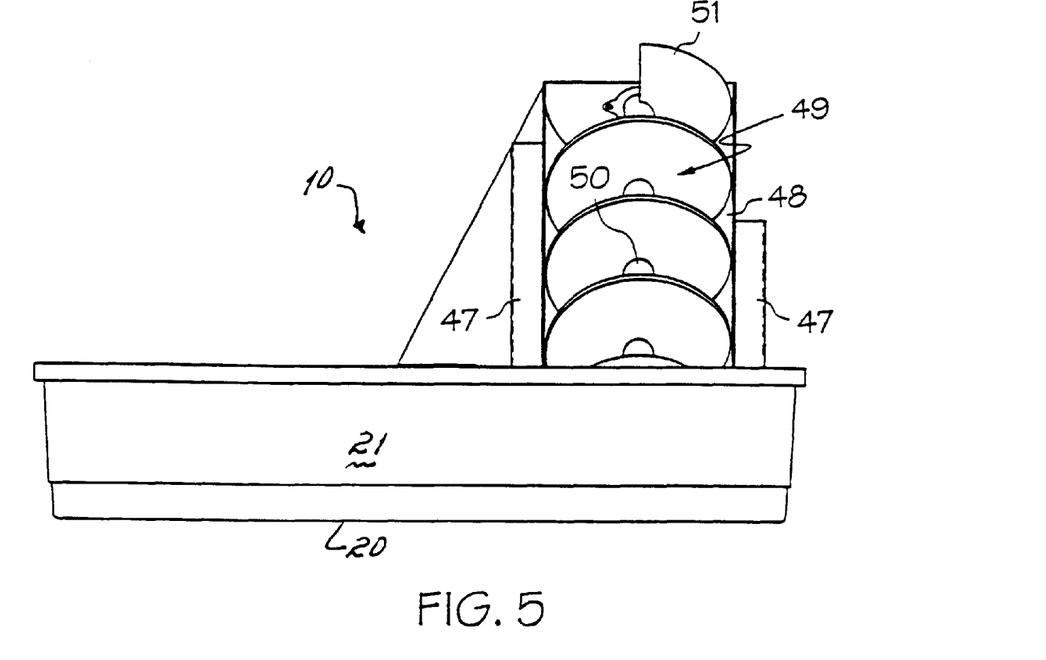
FIG. 5 is a side elevational view of the self-cleaning pet litter box assembly of FIG. 2 illustrating in particular a conveyor.
Figure 6:
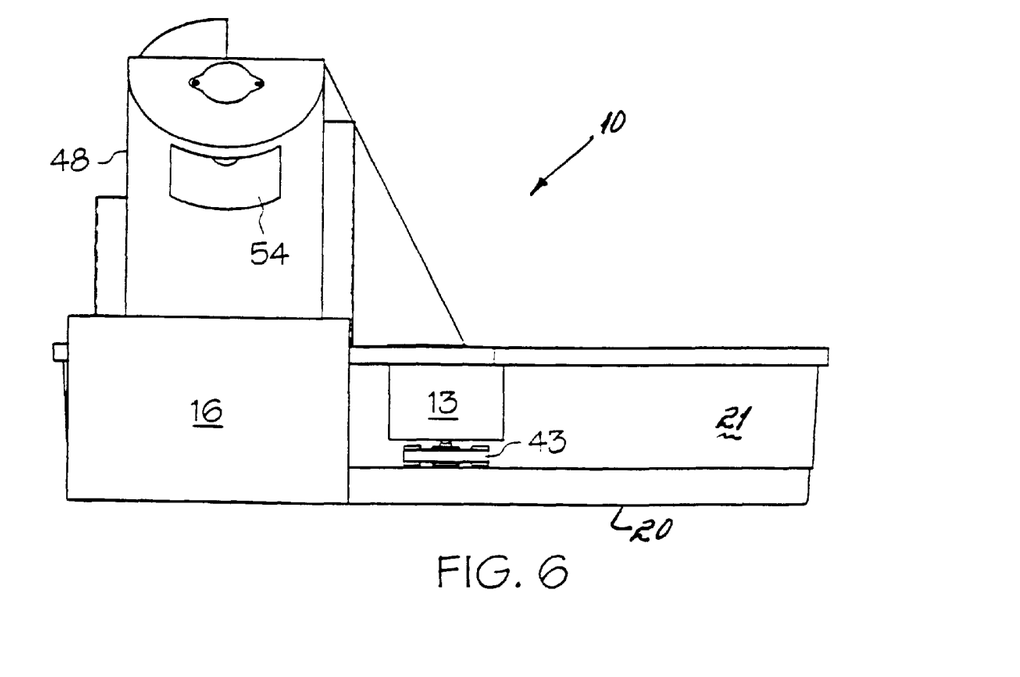
FIG. 6 is an opposite side elevational view of the self-cleaning pet litter box assembly of FIG. 5 illustrating in particular an underside of the conveyor and an associated drop hole.

With reference to FIG. 4, the motor 13 is permanently mounted on the base member 11 to provide power to rotate the open-top pet litter container 12. The motor 13 is an electric motor with an electric cord (not shown) for plugging into a conventional wall outlet. Alternatively, the electric motor can be battery powered. A drive shaft 42 extending from the motor is used to operatively connect the motor to the pet litter container 12 to rotate the container. As shown, a drive belt 43 is mounted on the drive shaft 42. The drive belt 43 extends around the sidewalls 21 of the pet litter container 12 within the lower recess 27. Tension in the drive belt 43 is adjusted to transfer rotary motion in the motor's drive shaft 42 to cause the drive belt 43 to force along the pet litter container 12. The motor 13 is geared to cause a slow rotation in the pet litter container 12. It has been found that a rate of rotation of less than about forty-eight revolutions per day, preferably from about one revolution per day to about thirty-six revolutions per day is sufficiently slow that a cat using the assembly of the invention does not detect, or at least is not disturbed, by the litter container's motion.

The rotation of the pet litter container can be continuous. Alternatively, the rotation can be intermittent. That is, at set intervals, the pet litter container can be caused to rotate a full revolution, e.g. one full rotation per hour. A sensor can also be used to sense when the cat is on the pet litter box assembly and in response cause the pet litter container to rotate at least one full revolution to separate out and convey away the clumped material.

The assembly of the invention also includes the sieve member 14 and conveyor 15 to separate out the clumped material and convey it away. The sieve member 14 and a chute of the conveyor can be integral or, as best seen in FIG. 2, two separate components positioned to work together as described in detail below. With reference to FIG. 7, the sieve member 14 is positioned to extend past the top rim of the pet litter container and preferably terminate at or near the litter container's bottom wall 30. Necessarily, the sieve member 14 extends into the pet litter in the litter container 12 and is in position to contact a substantial portion of the contents of the litter container as it rotates. Preferably, the sieve member 14 is shaped to extend from the pet litter container's sidewall 31 to the hollowed center post 32. The sieve member itself has an upwardly curved surface conducive to receiving clumped and unclumped material and directing it inwardly to the center of the sieve member. A series of openings 46 in the sieve member are present. Each opening 46 is sized to retain clumped material, but allow unclumped material to fall through and back into the litter container. Preferably, each opening 46 is rectangular-shaped with varying lengths of from about one inch to about six inches and widths of about 0.1 inches to about 0.4 inches. The length of the opening is not important and is more dictated by the sieve's member configuration as shown.

The conveyor 15, including its chute, is used to receive clumped material from the sieve member 14 and convey it away. It is mounted to the assembly by mount brackets 47. As best seen in FIGS. 2–5 and 7, the conveyor has an elongated chute 48 and a motor driven augur 49. The chute 48 has a proximal terminus which is positioned at the exit end of the sieve member 14 such that clumped material is forced into the chute 48 by advancing clumped and unclumped material in the sieve member 14 until it reaches the augur 49. The augur 49 includes a shaft 50 and a continuous spiral blade 51 mounted to rotate and necessarily catch the clumped material and move it along the chute to the chute's distal terminus. In this embodiment of the self-cleaning pet litter box assembly 10, the sieve member 14 and elongated chute 48 form a separating member that is operable to separate clumped litter material from unclumped litter material and direct the separated-out clumped litter material away along its length toward the distal terminus or exit end of the chute 48. Preferably, the elongated chute 48 also has a series of openings 52 at its proximal terminus to allow unclumped material to drop back into the pet litter container. As seen in FIGS. 2, 3, 6 and 7, a drop hole 54 at the chute's distal terminus serves to remove the clumped material on the conveyor. Preferably, the clumped material is deposited in the waste receptacle 16.

Optionally, a drop chute in the form of a flexible tube (not shown) can be attached at the elongated chute's drop hole 54. The drop chute extends downwardly and into the waste receptacle 16. The drop chute serves to better confine the clumped material and reduce dust and odor levels.

The augur 49 is driven by the motor 13 or has its own motor. Preferably, the motor 13 is appropriately geared to power both the pet litter container and the augur as discussed in detail below.

Conveyor mechanisms other than the above discussed augur can be used to convey away the separated clumped material. For example, a continuous belt can be used. Still other conventional conveyors can be routinely adapted for use in the self-cleaning pet litter box assembly of the invention.

Figure 3:
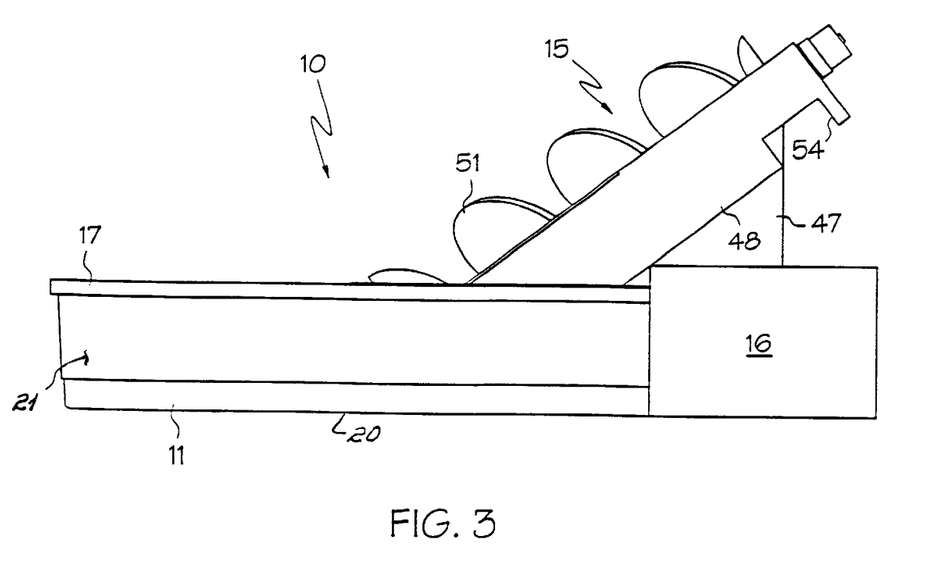
FIG. 3 is a side elevational view of the self-cleaning pet litter box assembly of FIG. 2 illustrating in particular a waste receptacle.

As seen in FIGS. 2 and 3, the waste receptacle 16 is positioned under the drop hole 54 of the chute 48 to receive the clumped material. The waste receptacle 16 as shown is open-top and is sized to hold sufficient clumped material that the pet owner need only empty or replace the waste receptacle on occasion, for example once per week. Needless to say, the greater the capacity of the waste receptacle, the less often the pet owner must empty or replace the receptacle. A lid with an access opening can be provided and is preferred to minimize clumped material smell.

Figure 9:
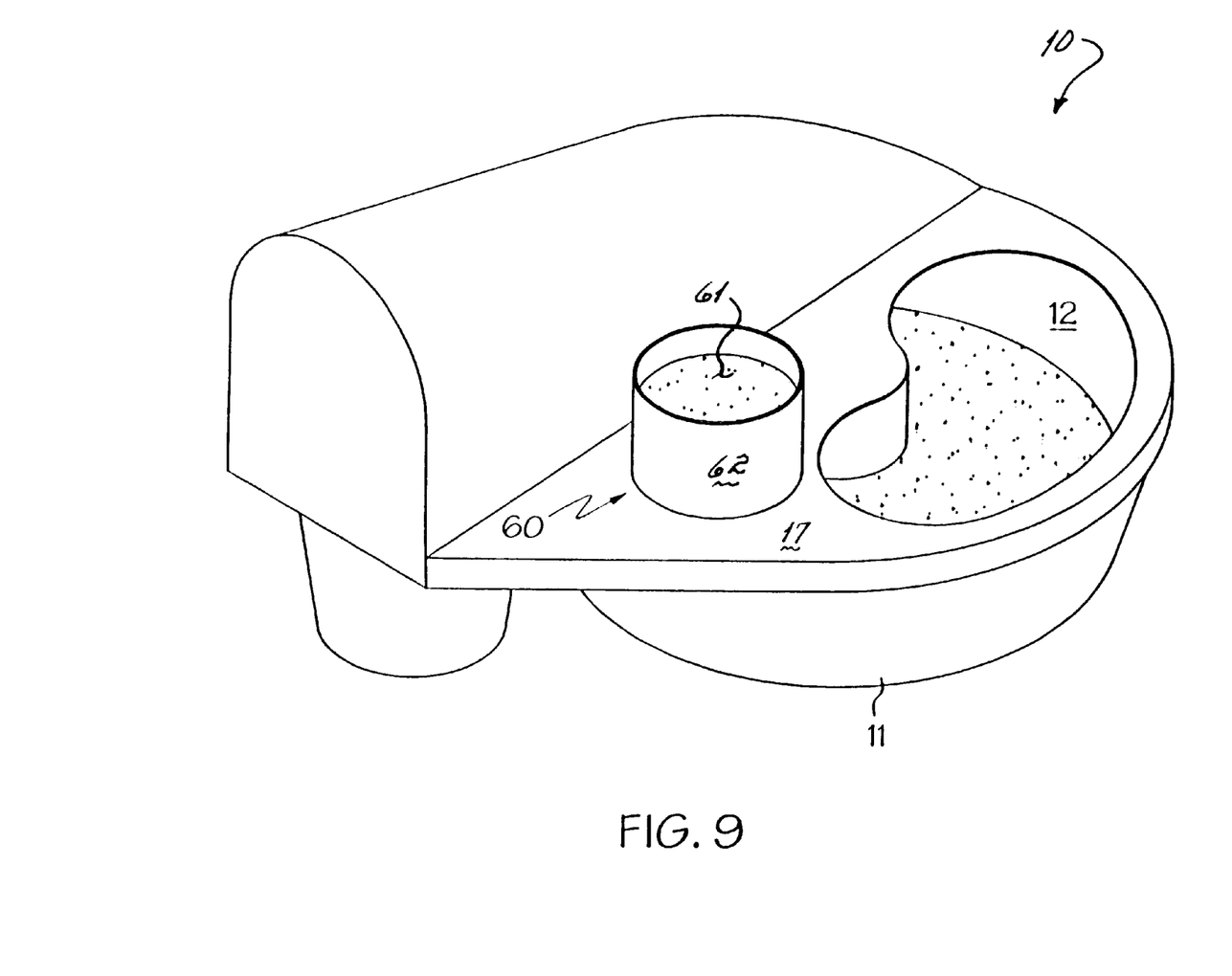
FIG. 9 is a view in perspective of the self-cleaning pet litter box assembly of FIG. 1 modified to have an automatic pet litter fill mechanism.
Figure 10:
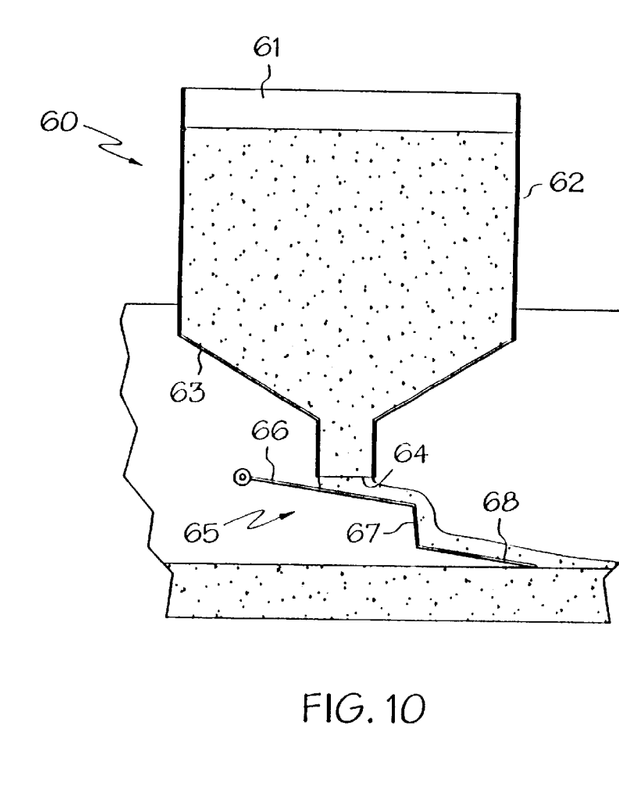
FIG. 10 is a partial side view in elevation showing operation of the pet litter fill mechanism of FIG. 9.
Figure 11:
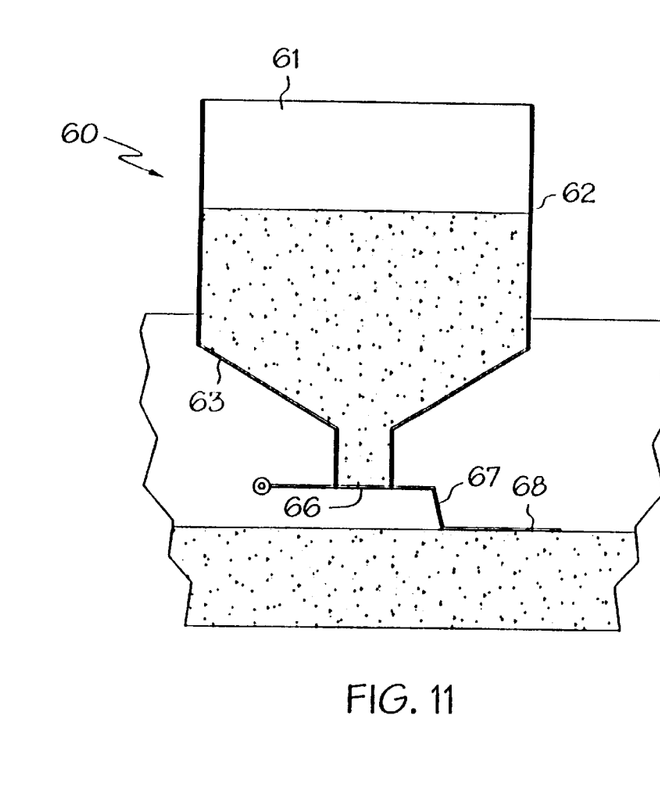
FIG. 11 is another partial side view in elevation showing the pet liter fill mechanism of FIG. 10 in a rest position.

With reference to FIGS. 9–11, a preferred embodiment of the self-cleaning pet litter box assembly of the invention has an automatic pet litter fill mechanism 60. A reservoir 61 is used for adding fresh pet litter to the litter container 12 to replenish the pet litter as needed. The reservoir 61 is mounted on the assembly, for example on the cover 17 as shown. The reservoir 61 has a cylindrical-shaped main body 62 with converging bottom walls 63 to create a funnel. An opening 64 at the bottom of the converging walls 63 serves as an egress for pet littler contained in the reservoir. The reservoir further has a sensor 65 extending into the pet litter container to sense the absence of a proper level of the pet litter. Different sensing devices can be used. As shown, a spring-loaded trap door plate 66 has a first arm 67 extending downwardly therefrom and a second arm 68 extending substantially horizontally from the first arm 67. The trap door plate 66 and the second arm 68 extend in substantially parallel planes. When pet litter in the pet litter container is at a desired level as seen in FIG. 11, the second arm 68 of the sensor 65 rests on top of the pet litter and the trap door plate 66 is in a closed position. As the pet litter box assembly is used and clean litter is depleneished over time, the level of pet litter in the pet litter container 12 drops. This causes the second arm 68 to drop with the trap door plate 66 also dropping to allow pet litter in the reservoir to egress the reservoir's opening 64. The pet litter flows into the pet litter container 12 until the desired pet litter level is again attained. The pet owner merely has to observe the level of pet litter in the reservoir and periodically add to it to keep it substantially full.

Figure 12:
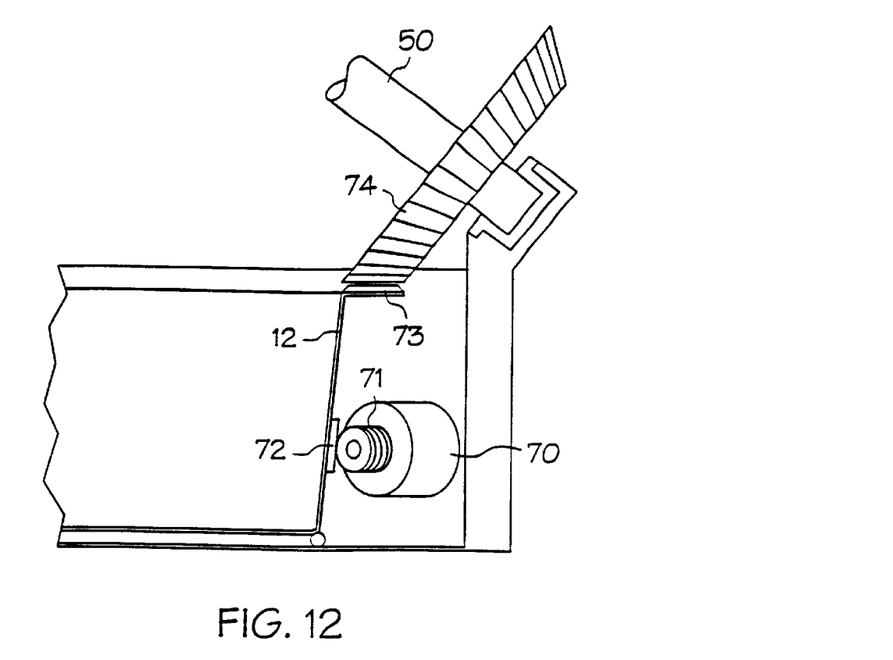
FIG. 12 is a partial side view in elevation showing an alternative drive system for the pet litter container and conveyor of the self-cleaning pet litter box assembly of FIG. 2.
Figure 13:
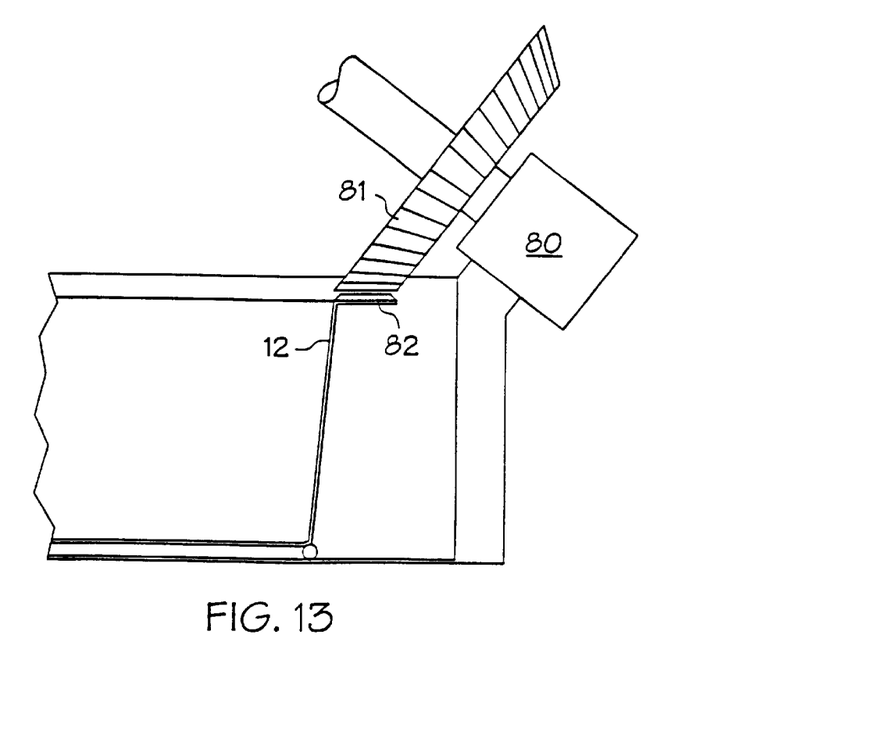
FIG. 13 is a partial side view in elevation showing still another drive system for the pet litter container and conveyor of the self-cleaning pet litter box assembly of FIG. 2.

FIGS. 12 and 13 illustrate alternative drive systems for the self-cleaning pet litter box assembly. With reference to FIG. 12, a single motor 70 is used to drive the pet liter container 12 and the conveyor 15. A worm gear 71 is connected to the drive shaft of the motor 70 in a known manner. Worm gear teeth 72 which extend around the pet litter container 12, are operably connected to the worm gear 71. Additionally, pinion gear teeth 73 mounted on a top ledge of the pet litter container 12 is in a meshing relationship with a pinion gear 74 fixedly mounted on the conveyor shaft 50. The motor 70—drives the worm gear 71 which causes the pet litter container 12 to rotate. As it rotates, the pinion gear teeth 73 cause the pinion gear 74 to rotate which in turn rotates the conveyor shaft 50. Gearing of the worm gear and pinion gear to achieve the proper pet litter container rotation and conveyor speed is done in a conventional fashion.

With reference to FIG. 13, the motor 80 of the self-cleaning pet litter box assembly is used to initially drive the pinion gear 81 mounted on the conveyor shaft 50. The motor's drive shaft (not shown) is operably connected to the shaft 50. The pinion gear 81 is fixedly mounted on the shaft and operably connected to pinion gear teeth 82 secured to the top ledge of the pet litter container 12. Power from the motor 80 drives the shaft 50 which causes the pinion gear 81 to rotate. Power from the pinion gear in turn is transformed to the pinion gear teeth 82 to cause the desired pet litter container 12 rotation. Still other drive systems to cause a rotation of the pet litter container about the base member is possible. Similarly, bearing systems of various natures are usable to facilitate a smooth rotation.

In use, the open-top pet litter container 12 of the assembly 10 has litter material added to a normal depth and the assembly is placed in the home in a normal out-of-the-way spot. Preferably, the litter material is of the clumping-type which is commercially available. The motor 13 is activated by plugging it into a wall outlet or a switch turned on. In due course, the pet uses the litter box assembly 10. The pet is likely unaware of any rotating motion. The pet leaves the litter container 12 when finished. The litter container continues to rotate or begins to rotate depending on the motion embodiment selected and eventually clumped material is forced into the sieve member 14. It is directed by the conveyor 15, including its elongated chute 48, to the waste receptacle 16. Unclumped material which is forced into the sieve member 14 drops through the sieve member's openings 46 and back into the pet litter container. After sufficient time, the optional pet litter sensor senses a low level of pet litter in the litter container 12 and activates the automatic pet litter fill mechanism 60.

After a time which the cat owner has learned to be normal, e.g. seven to ten days, the waste receptacle 16 is near full and needs to be emptied or removed. In the embodiment with the automatic pet litter fill mechanism 60, the reservoir 61 must be periodically checked and refilled, again normally every seven to ten days.

Figure 14:
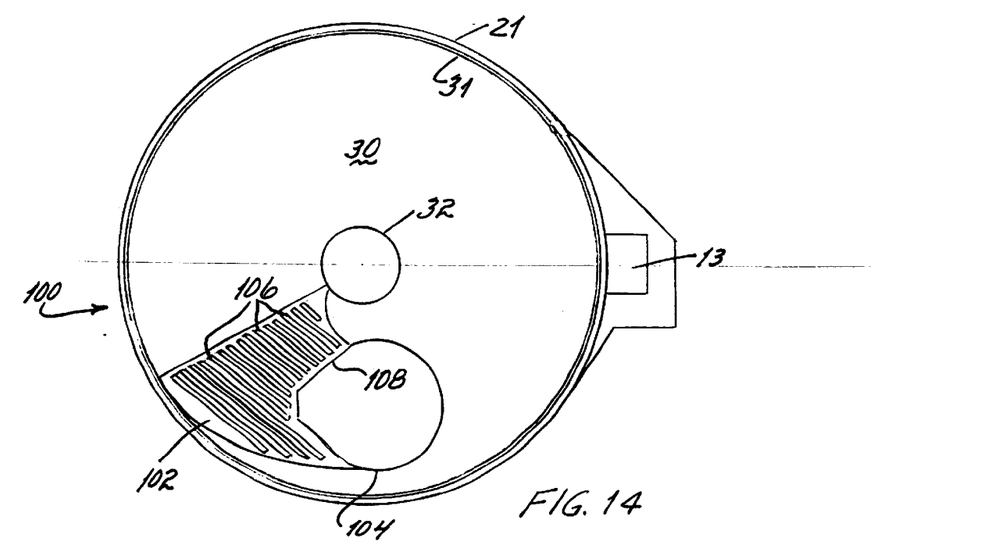
FIG. 14 is a top plan view of a self-cleaning pet litter box assembly in accordance with a second embodiment of the present invention, with the pet litter and a cover removed for illustrations purposes.
Figure 15:
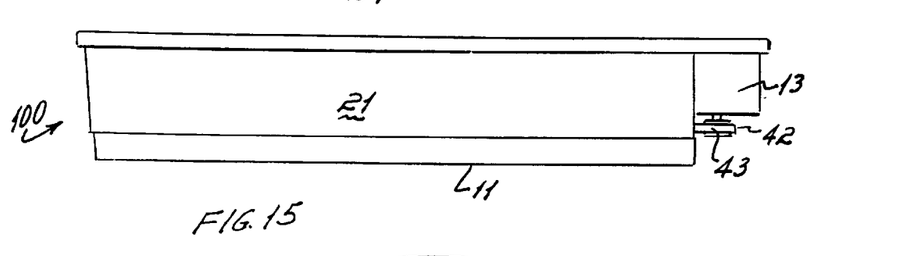
FIG. 15 is a side elevational view of the self-cleaning pet litter box assembly of FIG. 14 illustrating in particular a placement of a motor.
Figure 16:
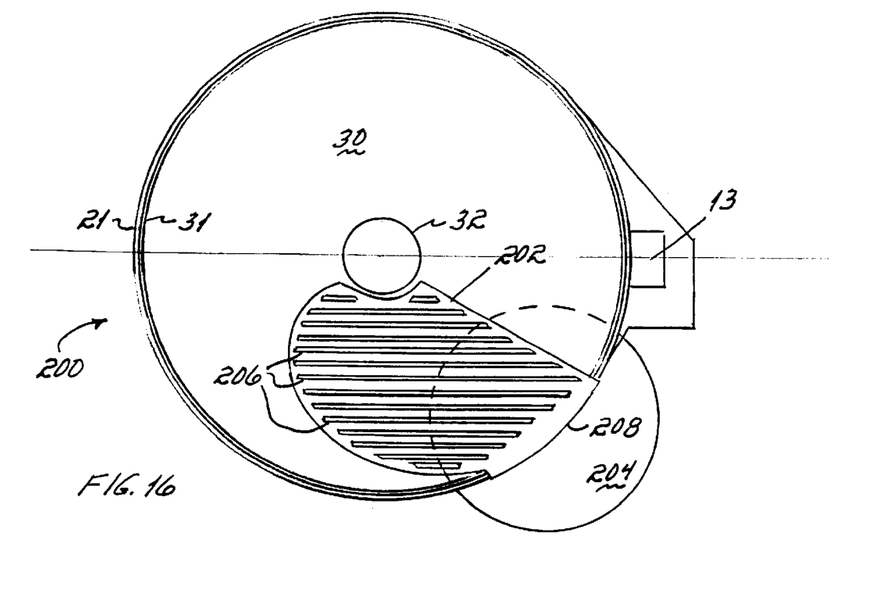
FIG. 16 is a top plan view of a self-cleaning pet litter box assembly in accordance with a third embodiment of the present invention.

Referring now to FIGS. 14 and 15, an alternative self-cleaning pet litter box assembly 100 in accordance with the principles of the present invention is shown, where like numerals represent like parts to the pet litter box assembly 10 of FIGS. 1–13. In this embodiment, a stationary or fixed sieve member 102 is positioned to extend into the pet litter container 12 to contact litter within the container for separating clumped litter material from unclumped litter material. A waste receptacle 104 can, as seen in FIG. 14, be integral with the sieve member 102 or, as seen in the embodiment of FIG. 16, be a separate component positioned outside the litter container 12 as described below.

The sieve member 102 is positioned to extend past the top rim of the pet litter container 12 and preferably terminate at or near the litter container's bottom wall 30. Necessarily, the sieve member 102 is in position to contact a substantial portion of the contents of the litter container 12 as it rotates. Preferably, the sieve member 102 is shaped to extend from the pet litter container's sidewall 31 to the hollowed center post 32.

The sieve member 102 itself has an upwardly curved surface conducive to receiving clumped and unclumped material and directing it inwardly to its center. The sieve member 102 may include walls (not shown) extending upwardly from the sieve member 102 to further contain and direct the moving clumped and unclumped litter material. A series of openings 106 in the sieve member 102 are present. Each opening 106 is sized to retain clumped material, but allow unclumped material to fall through and back into the litter container. Preferably, each opening 106 is rectangular-shaped with varying lengths of from about one inch to about six inches and widths of about 0.1 inches to about 0.4 inches. The length of the opening is not important and is more dictated by the sieve member configuration as shown.

As most evident in FIG. 14, the sieve member 102 is configured to extend to a waste receptacle 104, with the waste receptacle 104 positioned at an exit end of the sieve member 102. The sieve member 102 is shaped to direct separated-out clumped material along its length and into the waste receptacle 104. The clumped material is directed along the sieve member 102 by advancing clumped and unclumped materials until it reaches a lip 108 at its exit end, whereupon the clumped material drops into the waste receptacle 104. Periodically, the pet owner must remove the sieve member 102 and empty the waste receptacle 104.

Alternatively, and with reference to self-cleaning pet litter box assembly 200 of FIG. 16, a sieve member 202 is positioned in the litter container 12 to extend to a free-standing waste receptacle 204 positioned outside the litter container 12. The sieve member 202 is shaped to extend over the litter container's perimeter such that clumped material is directed to the waste receptacle 204. The sieve member 202 itself has an upwardly curved surface conducive to receiving clumped and unclumped material and directing it inwardly toward its center. The sieve member 202 may include walls (not shown) extending upwardly from the sieve member 202 to further contain and direct the moving clumped and unclumped litter material. A series of openings 206 in the sieve 202 are present. The clumped material is directed along the sieve member 202 by advancing clumped and unclumped materials until it reaches a lip 208 at its exit end, where upon the clumped material drops into the waste receptacle 204. The waste receptacle 204 as shown is open-top and is sized to hold sufficient clumped material that the pet owner need only empty or replace the waste receptacle on occasion, for example one per week. Needless to say, the greater the capacity of the waste receptacle, the less often the pet owner must empty or replace the receptacle. A lid with an access opening can be provided and is preferred to minimize clumped material smell.

While the invention has been described with particular reference to the drawings, it should be understood various changes and modifications can be made to the litter box cleaning system and its method of use. All such changes and modifications of an obvious nature are considered within the scope of the appended claims.

Having described the invention, I claim:

1. A self-cleaning pet litter box assembly for separation and removal of clumped material from clean litter material, comprising:

an open-top pet litter container for holding litter, said pet litter container being mounted for substantially horizontal rotation;

a drive mechanism operatively connected to the pet litter container to rotate said container; and a stationary separating member positioned to extend into the pet litter container to contact litter within the pet litter container and operable to separate clumped litter material from unclumped litter material and direct the separated-out clumped litter material away along its length toward an exit end of the separating member.

2. The self-cleaning litter box assembly of claim 1 further comprising a waste receptacle positioned adjacent the exit end of the separating member to receive clumped material directed away by the separating member.

3. The self-cleaning litter box assembly of claim 2 wherein the waste receptacle is integral with the separating member.

4. The self-cleaning litter box assembly of claim 1 wherein the separating member includes a plurality of openings formed therein operable to retain clumped material and permit unclumped material to pass through the separating member.

5. The self-cleaning litter box assembly of claim 4 wherein the separating member comprises a sieve member having the plurality of openings and an elongated chute operatively connected to the sieve member.

6. The self-cleaning litter box assembly of claim 5 wherein the elongated chute has a drop hole near the exit end of the separating member for receiving clumped material directed along the separating member.

7. The self-cleaning litter box assembly of claim 1 further comprising a conveyor in operable association with the separating member to convey the separated-out clumped litter material toward the exit end of the separating member.

8. The self-cleaning pet litter box assembly of claim 7 further comprising gearing to cause the drive mechanism to both rotate the pet litter container and drive the conveyor.

9. The self-cleaning pet litter box assembly of claim 7 wherein the conveyor comprises an augur for moving clumped material toward the exit end of the separating member.

10. The self-cleaning pet litter box assembly of claim 1 further having a cover to fit over the open-top pet litter container, said cover having a cut-out to expose litter contained within the pet litter container and provide access to the litter for use by the pet.

11. The self-cleaning pet litter box assembly of claim 1 wherein the drive mechanism has a drive shaft and a drive belt positioned around the pet litter container and connected to the drive shaft to rotatably move the pet litter container.

12. The self-cleaning litter box assembly of claim 1 further comprising an automatic pet litter fill mechanism to maintain a desired level of pet litter in the pet litter container.

13. A self-cleaning pet litter box assembly for separation and removal of clumped material from clean litter material, comprising:

a base member for placement on a level surface;

a circular-shaped open-top pet litter container for holding litter, said pet litter container being mounted for substantially horizontal rotation on the base member;

a drive mechanism operatively connected to the pet litter container to rotate said container;

a stationary separating member positioned to extend into the pet litter container to contact litter within the pet litter container and having a plurality of openings formed therein operable to separate clumped litter material from unclumped litter material, the separating member further being configured to direct the separated-out clumped litter material away along its length toward an exit end of the separating member; and a waste receptacle positioned adjacent the exit end of the separating member to receive clumped material directed away by the separating member.

14. The self-cleaning litter box assembly of claim 13 wherein the waste receptacle is integral with the separating member.

15. The self-cleaning litter box assembly of claim 13 further comprising a conveyor in operable association with the separating member to convey the separated-out clumped litter material toward the waste receptacle.

16. The self-cleaning pet litter box assembly of claim 15 wherein the conveyor comprises an augur for moving clumped material toward the waste receptacle.

17. The self-cleaning pet litter box assembly of claim 13 wherein the drive mechanism causes the pet litter container to rotate continuously.

18. The self-cleaning pet litter box assembly of claim 13 wherein the drive mechanism causes the pet litter container to rotate intermittently.

19. The self-cleaning litter box assembly of claim 13 wherein the separating member comprises a sieve member having the plurality of openings and an elongated chute operatively connected to the sieve member.

20. The self-cleaning litter box assembly of claim 19 wherein the elongated chute has a drop hole near the exit end of the separating member for receiving clumped material directed along the separating member and directing the clumped material to the waste receptacle.

21. The self-cleaning litter box assembly of claim 13 further comprising an automatic pet litter fill mechanism to maintain a desired level of pet litter in the pet litter container.

22. A method of removing clumped material from clean litter material in a pet litter box assembly having a horizontally rotating pet litter container and a stationary separating member positioned to extend into the pet litter container to contact litter within the pet litter container, comprising:

rotating the pet litter container to advance the clumped material to the separating member;

separating the clumped material from the clean litter material by passing the clean litter material through the separating member; and directing the separated-out clumped litter material along the length of the separating member toward an exit end of the separating member.

23. The method of claim 22 further comprising the step of:

positioning a waste receptacle proximate the exit end of the separating member; and receiving the separated-out clumped litter material in the waste receptacle.

24. The method of claim 22 further comprising the step of conveying the separated-out clumped litter material toward the exit end of the separating member.

25. The method of claim 22 further comprising the step of rotating the pet litter container continuously.

26. The method of claim 22 further comprising the step of rotating the pet litter container intermittently.

* * * * *